United States Patent [19]

McGuire et al.

[11] Patent Number: 5,040,342
[45] Date of Patent: Aug. 20, 1991

[54] METHOD AND APPARATUS FOR PROCESSING GLASS SHEETS

[75] Inventors: Kenneth J. McGuire, Sarver; Dennis J. Korber, Arnold, both of Pa.; Donald P. Michelotti, Rochester Hills, Mich.; Gary V. Cannon, Wexford; Donald A. Mackey, Pittsburgh, both of Pa.

[73] Assignee: PPG Industries, Inc., Pittsburgh, Pa.

[21] Appl. No.: 255,242

[22] Filed: Oct. 11, 1988

[51] Int. Cl.⁵ .............. B24B 7/00; B24B 9/00
[52] U.S. Cl. .................. 51/283 E; 51/326; 51/5 C; 65/174; 65/112
[58] Field of Search .............. 51/283 R, 283 E, 321, 51/410, 5 C, 326, 327; 65/174, 112; 83/881, 886, 887

[56] References Cited

U.S. PATENT DOCUMENTS

| | | | |
|---|---|---|---|
| 3,343,436 | 9/1967 | Cockrell | 83/884 |
| 3,453,097 | 7/1969 | Hafner | 65/112 |
| 3,574,976 | 4/1971 | McMaster | 51/283 |
| 3,678,628 | 7/1972 | McMaster | 51/5 |
| 3,834,258 | 9/1974 | Zumstein | 83/11 |
| 3,921,873 | 11/1975 | Dahlberg et al. | 225/2 |
| 3,932,962 | 1/1976 | Devillers | 51/65.72 |
| 3,991,636 | 11/1976 | Devillers | 83/12 |
| 4,422,149 | 12/1983 | Reinmold et al. | 364/473 |
| 4,424,569 | 1/1984 | Imazeki et al. | 364/474 |
| 4,466,562 | 8/1984 | DeTorre | 225/2 |
| 4,495,845 | 1/1985 | Sherby | 83/886 |
| 4,502,125 | 2/1985 | Yoneda et al. | 364/474 |
| 4,577,539 | 3/1986 | Bonacci | 83/886 |
| 4,587,764 | 5/1986 | Leone et al. | 51/283 E |
| 4,648,210 | 3/1987 | Reinmold et al. | 51/165.77 |
| 4,656,791 | 4/1987 | Herrington | 51/410 |
| 4,672,874 | 6/1987 | Gach | 83/881 |
| 4,698,088 | 10/1987 | Bando | 65/174 |
| 4,744,176 | 5/1988 | Sack et al. | 51/165.71 |

FOREIGN PATENT DOCUMENTS

2476059  8/1981  France .............. 51/283 R

Primary Examiner—Robert A. Rose
Attorney, Agent, or Firm—Andrew C. Simmerio

[57] ABSTRACT

The glass sheet processing apparatus includes a sheet support stand which rotates the glass about a vertical axis and cutting and edging tools that move along linear axes generally perpendicular to the vertical axis. As the glass is rotated, the cutting tool moves towards and away the support stand to score the desired outline configuration of the glass part. The undesired trim portion of the glass is then removed. The glass sheet is then rotated and the edging tool is moved towards and away from the support stand to grind the periphery of the glass part to its final finished edge.

11 Claims, 6 Drawing Sheets

METHOD AND APPARATUS FOR PROCESSING GLASS SHEETS

BACKGROUND OF THE INVENTION

1. Field of the Invention

This invention relates to the cold end processing of glass sheets, and in particular to an automated system for cutting, breakout and edging a glass sheet at a single station without indexing the glass between manufacturing processes.

2A. Technical Consideration

Glass sheets are fabricated to various shapes to conform with the outlines required for fabricated products such as windows for automobiles or other vehicles, architectural windows, glass doors, etc. Typically, a flat glass sheet is positioned at a first station where the glass is scored along the outline of the desired glass shape. The glass sheet is then indexed to a second station where the undesired portions of glass, or salvage, are removed. The glass shape is then moved to a third station where the edge of the glass is ground to remove any sharp edges along its outline.

During this process, the glass is highly susceptible to misalignment during its continual indexing from one position to another position in the different operating stations. Generally the glass sheet must be continually realigned to insure that the glass is in the proper position for each operation. It would be useful to have a glass sheet cutting, breakout, and edging arrangement that maintains the glass at a single station thus eliminating the inherent problems associated with product indexing. In addition, it would be advantageous to incorporate numerical control technologies into such a system so as to enhance system flexibility.

2B. Patents of Interest

U.S. Pat. No. 3,343,436 to Cockrell teaches a control system for selectively operating cutting devices in a controlled sequence to cut a linearly moving glass sheet into glass sheets of smaller width along lines parallel to its direction of movement.

U.S. Pat. No. 3,453,097 to Hafner teaches a method of cutting glass wherein the glass sheet is moved continuously passed a laser beam which is focused upon the glass sheet. The glass absorbs the laser energy and converts it into sufficient heat to enable separation of the glass into pieces along the line swept by the laser beam.

U.S. Pat. No. 3,834,258 to Zumstein teaches an apparatus for cutting glass moving with relative motion with respect to the cutting tools. The glass plate is supported on a table and a bridge extending over the table carries the cutting tools which are displaceable in a longitudinal direction.

U.S. Pat. No. 3,921,873 to Dahlberg et al. teaches heating a glass sheet near a scored line to help propagate the score through the glass to help remove the edge of the sheet.

U.S. Pat. Nos. 3,932,962 and 3,991,636 to Devillers teach a control apparatus for a machine for cutting and grinding the edges of a glass sheet. In the cutting operation, the apparatus includes a horizontal table for supporting the glass sheet, a horizontal jig defining the cutting path, a freely displaceable carriage equipped with a cutting tool, and a motor adapted to produce the displacement of the carriage along the jig. In the grinding operation, the apparatus includes a conveyor belt for advancing the glass sheet and a rotary grinding tool on one side of the conveyor, positioned so as to come into contact with an edge of the work piece as it is conveyed passed the grinding tool.

U.S. Pat. No. 4,422,149 to Reinmold et al. teaches a process and apparatus for correcting the control program of ad automatic glass sheet cutting machine by accounting for and correcting any X and/or Y coordinate discrepancies.

U.S. Pat. No. 4,424,569 to Imazeki et al. teaches a numerically controlled method and apparatus for a machine tool of the type having a plurality of tools which move in unison with a fixed positional relationship with respect to one another. The invention requires only a current position register for one of the tools to maintain machining efficiency.

U.S. Pat. No. 4,466,562 to DeTorre and U.S. Pat. No. 4,495,845 to Sherby teach scoring of a glass sheet by passing the glass between an upper scoring wheel and a lower support wheel.

U.S. Pat. No. 4,502,125 to Yoneda et al. teaches a numerical controller for an angular slide grinding machine capable of precisely controlling dressing feed movements of a work table. The machine includes a wheel head carrying a dressing tool and a grinding wheel.

U.S. Pat. No. 4,577,539 to Bonacci teaches an apparatus for cutting sheets of plate glass with a digital control unit in which the centrifugal force to which the tool-bearing cart and cutting wheel carried on it are subjected is eliminated or reduced to a minimum by reducing to a minimum the mass of the tool-bearing cart in motion, and by making the cart move in a purely rectilinear trajectory so that the cutting wheel does not have to follow curved trajectories which generate centrifugal forces transverse to the trajectory to be followed.

U.S. Pat. No. 4,648,210 to Reinmold et al. teaches an apparatus for grinding the edges of a glass sheet including a grinding disc mounted to rotate in a tool holder which may be moved in relation to the axis of rotation of a rotary table. The disc is driven by a constant torque motor so as to apply a constant grinding pressure between the grinding tool and the glass sheet.

U.S. Pat. No. 4,672,874 to Gach teaches a scoring wheel rotatably mounted on an axle within a mounting bracket. The bracket assembly reduces the tendency for accumulation of glass chips between the scoring wheel and supporting bracket.

U.S. Pat. No. 4,698,088 to Bando teaches a numerically controlled glass plate fabrication machine wherein the glass plate is moved linearly on a work table to progressively move the glass sheet from a cutting station to a cracking station, and finally to a grinding station.

SUMMARY OF THE INVENTION

The present invention teaches a method and apparatus for cutting and edging a glass sheet. The sheet is positioned on a support stand and rotated about an axis generally perpendicular to a major surface of the sheet. A cutting device is mounted on a slide arrangement that moves the cutting device towards and away from the support stand as the glass is rotated to allow a scoring wheel on the cutting device to score the desired outline configuration of a glass part. After scoring, a breakout assembly heats the scored glass sheet at predetermined locations and removes the outer trim portion of the glass sheet from the desired glass part. After the trim portion is removed, a glass sheet edging arrangement mounted on a slide that moves towards and away from the support stand, edges the glass sheet as the glass sheet is rotated on the stand. The required synchronized, simultaneous motion of the glass sheet about the rotary axis and the cutting and edging devices along their respective linear axes are controlled through the use of numerical controlled programming. The rotation of the glass combined with the linear movement of the cutting and edging devices presents the entire edge of the glass part to be cut to the cutting wheel and grinding wheel of the respective equipment.

The disclosed glass sheet processing equipment in the present invention allows the glass sheet to be positioned at a fixed location so that it may be cut and edged without any additional movement or indexing of the glass sheet.

DETAILED DESCRIPTION OF THE INVENTION

The present invention teaches the processing of sheet material and in particular, to shaping glass sheet blanks into glass parts having a desired configuration with a finished edge. Cutting and edging tools move along linear axes while a glass sheet supported at a sheet support arrangement is rotated about a rotary axis to present the entire edge of a glass part to the cutting and edging tools. The required synchronized, simultaneous motion control of the sheet about the rotary axis and the equipment along the linear axes is achieved through the use of numerical control programming methods. The glass sheet remains positioned at the sheet support so that there is no indexing of the glass sheet from a cutting to a breakout station or from breakout to an edging station.

Figure 1:
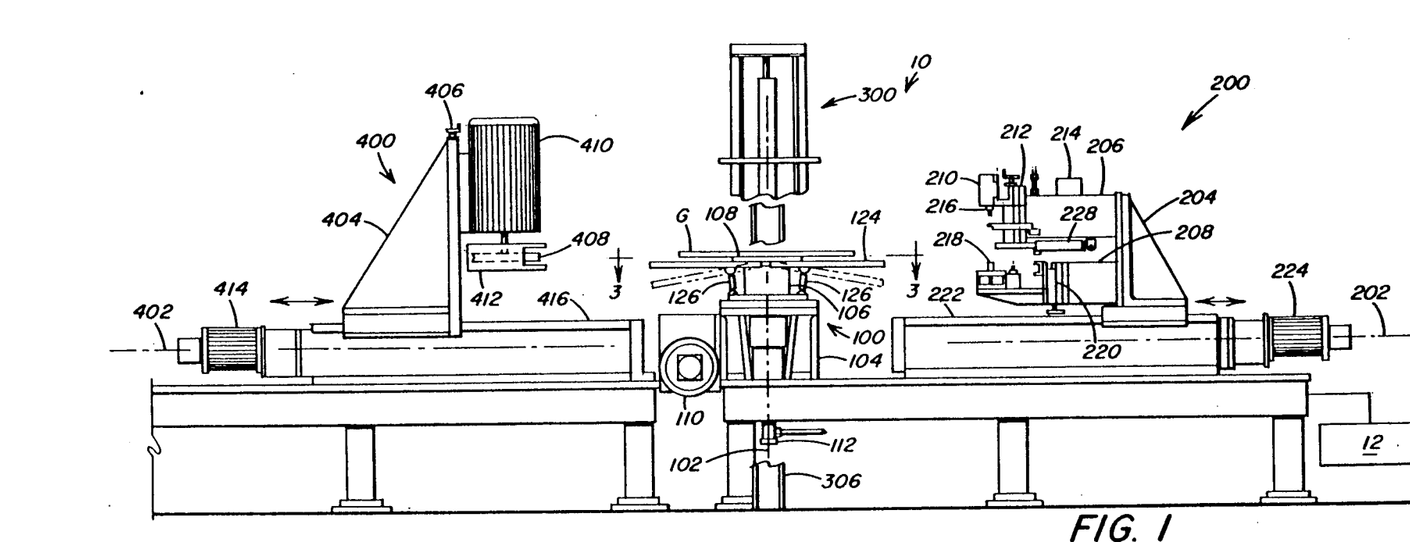
FIG. 1 is an elevational view of a single station cutting, breakout and edging system incorporating the novel features of the present invention.
Figure 2:
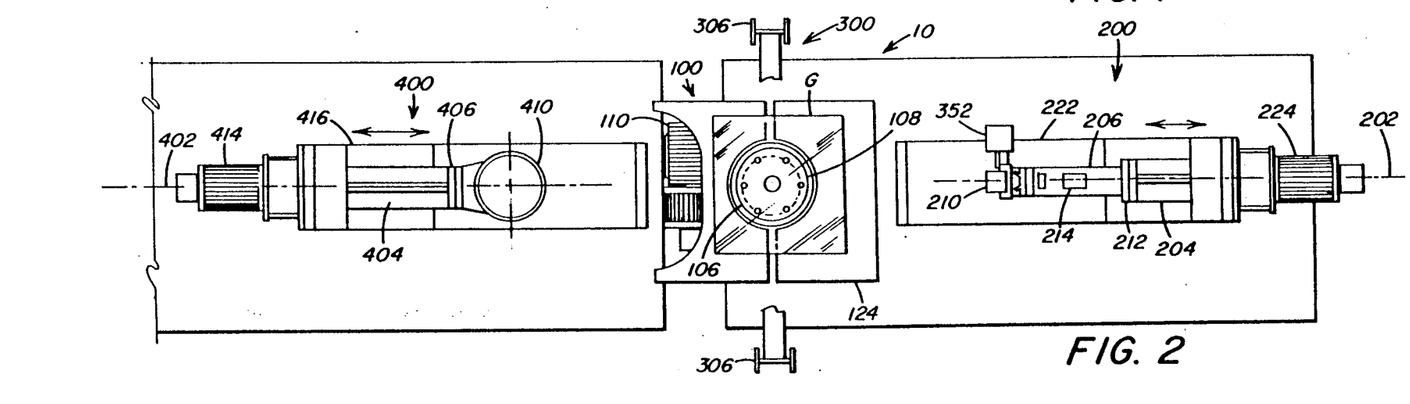
FIG. 2 is a plan view of the system shown in FIG. 1 with portions removed for clarity.

Referring to FIGS. 1 and 2, the single station cold end system 10 includes a glass sheet support station 100, a cutting apparatus 200, a glass sheet breakout apparatus 300, and an edging apparatus 400. The cutting apparatus 200 and edging apparatus 400 are positioned to move linearly along axes 202 and 402, respectively. Although not limiting in the present invention, in the particular embodiment illustrated in FIGS. 1 and 2, the axes 202 and 402 of the cutting apparatus 200 and edging apparatus 400, respectively, are colinear and pass through a vertical, rotary axis 102 at the center of the support station 100.

The cutting and edging operation in the present invention are numerically controlled. In order to effect such a control, the glass part to be processed must be coded or digitized in any convenient manner, for example, by laying out the part's periphery on a digitizing table and then transferring its X-Y coordinate locations into a data file of a host computer (not shown). This file is then used as data input for post processing cutting and edging routines. Within these post processing routines, the required velocities and associated accelerations and decelerations, as well as the required cutting pressures, are calculated while referencing the positional data. The output files of these post processing routines are downloaded from the host computer to a numerically controlled multi-axis, simultaneous motion controller 12 in a form readable by the controller 12. During operation, the controller 12 uses the downloaded information to control and coordinate the movement of the system 10 as will be discussed.

Figure 3:
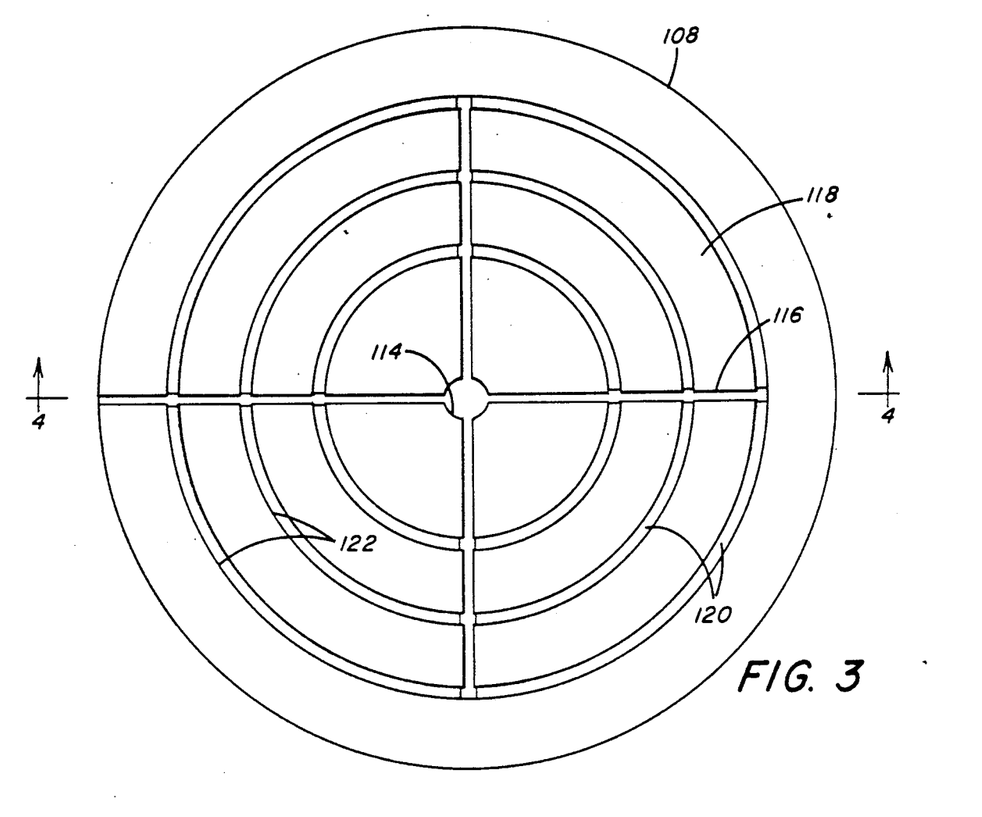
FIG. 3 is a plan view of the vacuum support plate of the support station along line 3—3 of FIG. 1.
Figure 4:
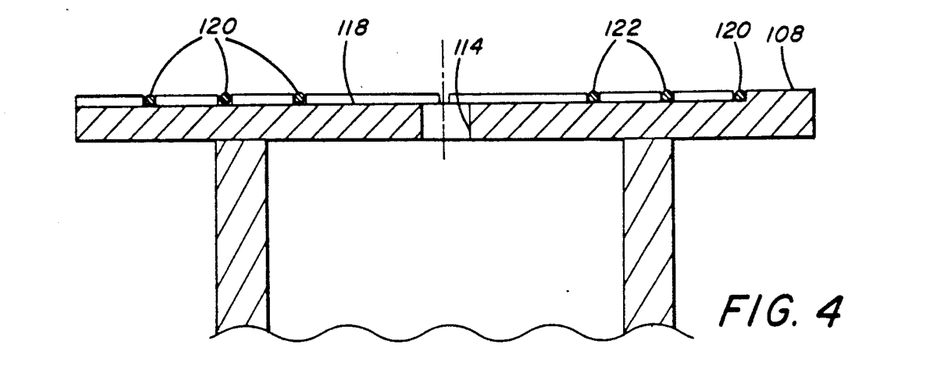
FIG. 4 is a cross-sectional view taken along line 4—4 of FIG. 3.

During operation, the glass sheet G is held on the support station 100 which includes a frame 104 supporting a rotatable vacuum chuck 106 having a vacuum platen 108. A motor and reducer arrangement 110 are provided to rotate the vacuum chuck 106 within the frame 104 about the vertical axis 102. A vacuum source (not shown) is connected to the vacuum chuck 106 via a rotary coupling 112, to draw a vacuum as the glass sheet G is supported and rotated on the support station 100. Referring to FIGS. 3 and 4, the vacuum platen 108 includes a center opening 114 which accesses radial passages 116 through which a vacuum is drawn along the face 118 of the vacuum platen 108. Resilient cushions 120, such as for example, sections of rubber O-rings may be positioned in grooves 122 to help support the glass sheets positioned on the vacuum platen 108. During operation, vacuum is drawn through the vacuum chuck 106 along vacuum platen 108 to secure a glass sheet G to be cut and edged on the support station 100, as will be discussed later. The platen 108 is sized so that the sheet material to be processed will not appreciably sag or otherwise deform outboard of the platen at the final desired outline of the sheet. When processing a glass sheet, if the glass is sufficiently thick, the platen may be significantly smaller than the final outline. If the sheet material is flexible, such as for example, a thin glass or plastic sheet, the platen 108 may have to extend out nearly to the desired outline.

Figure 5:
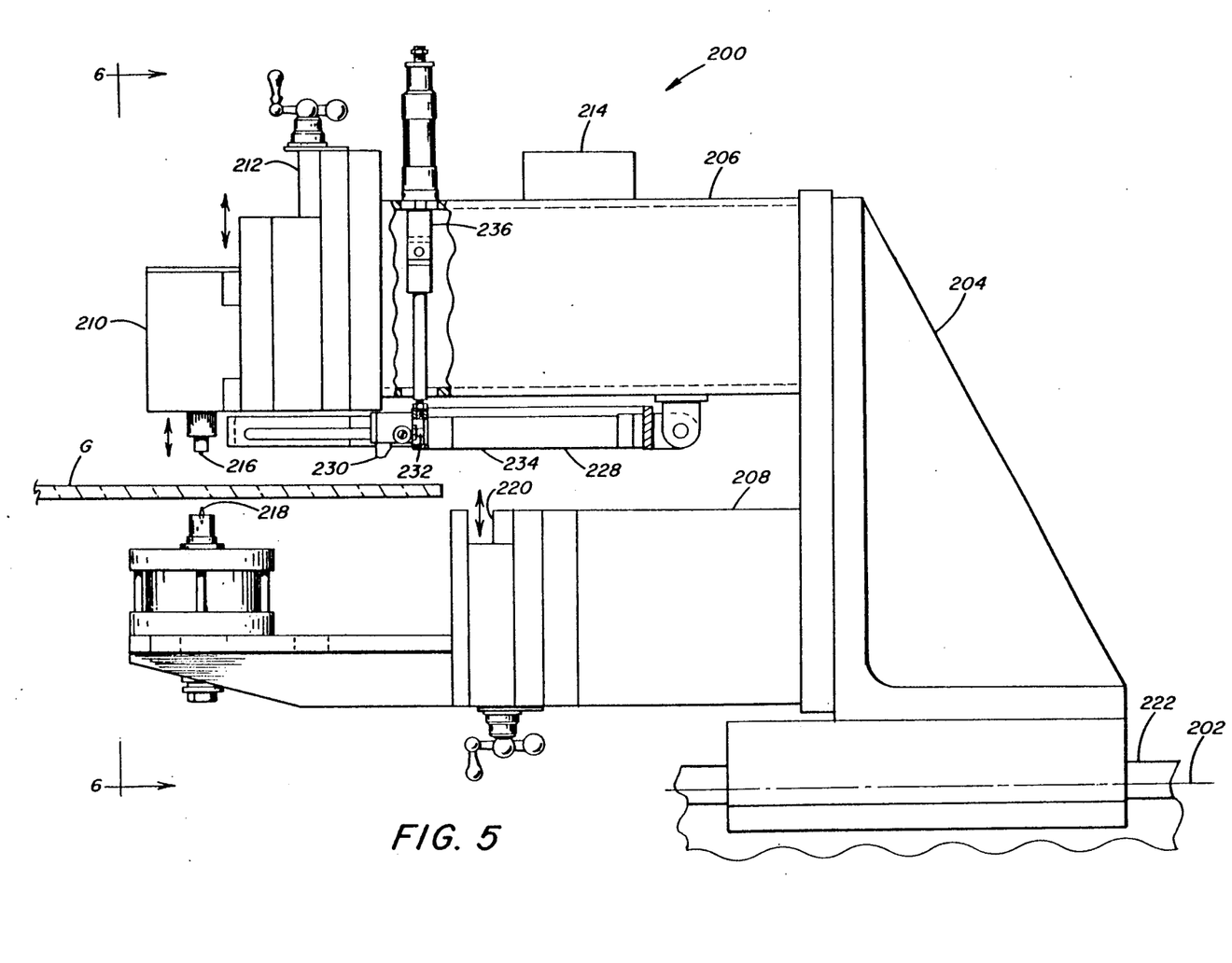
FIG. 5 is an enlarged elevational view of the cutting apparatus illustrated in FIG. 1.
Figure 6:
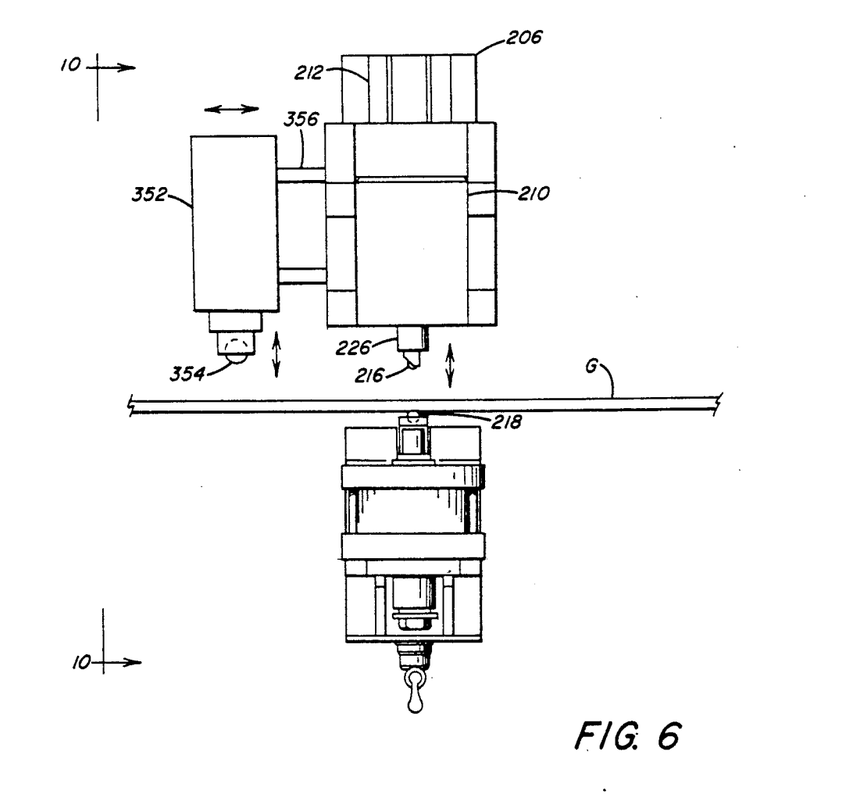
FIG. 6 is an end view of the cutting apparatus along line 6—6 of FIG. 5.

The cutting apparatus 200 is positioned to move linearly along horizontal axis 202 which, in the particular embodiment of the invention illustrated in FIGS. 1 and 2 is aligned with vertical axis 102 of the support station 100. The cutting apparatus 200 permits access to the perimeter of the glass sheet G while supporting the glass sheet at the point where it is being cut. Referring to FIGS. 5 and 6, the cutting apparatus 200 is a deep throated support structure including a bracket 204 supporting upper frame 206 and lower frame 208. The upper frame 206 includes a cutting head assembly 210 mounted on slide 212, which is connected to a numerically controlled, multi-pressure load device 214 that allows for the variation of the cutting pressure to a cutting wheel 216 of assembly 210, as will be discussed later. The lower frame 208 includes a support wheel 218, such as for example, a blank cutting wheel, mounted on vertically adjustable slide 220 and positioned directly opposite the cutting wheel 216 to back up the wheel 216 as it scores the glass G. As alternative, the lower frame 208 may include a pneumatically operated backup land (not shown), positioned in opposing relationship to the cutting wheel 216 to support the glass sheet under the cutting wheel 216 during the cutting operation. The surface of the land is preferably coated with a material that allows the glass to slide over the land with little or no resistance and with no marking, such as for example, polyflurocarbon polymer available from E. I. duPont de Nemours & Company and sold under the trademark Teflon. Referring to FIGS. 1 and 2, the mounting bracket 204 is mounted on a horizontal slide arrangement 222 which is driven by motor 224 along axis 202 toward and away from the support station 100.

The dynamics of pattern scoring of glass vary with the calculated velocity profile used in transversing the glass part periphery to score the glass. A slower cutting speed is required at the corners of the glass part to maintain accurate part shape. There is a tendency to achieve shallower scoring depths at the glass part corners due to the slower cutting speeds necessitated by cutter deceleration. It is preferred that the cutting operation produce a uniform score fracture in the glass sheet G to enhance breakout edge uniformity. Loading device 214 allows varying pressures to be applied to cutting head 216 to vary in response to a developed velocity profile programmed into the system software as discussed earlier, so as to maintain a uniform fracture depth along the score. Although not limiting in the present invention, in the embodiment of the invention shown in FIGS. 1, 2, 5, and 6 cutting wheel 216 is mounted on slide 226 (shown only in FIGS. 5 and 6) which is driven by an air cylinder (not shown) within assembly 210. In response to signals received from controller 12, loading device 214, which preferably is a digital pressure transducer, varies the air pressure from the device 214 to the air cylinder is assembly 210 resulting in a variation in the pressure applied to cutting wheel 216 for cutting the glass sheet G. The cutting operation is completed upon one full revolution of the glass sheet G at the support station 100. Average cutting speeds of up to 12 inches (30.5 cm) per second have produced acceptable scored patterns.

An alternate method of maintaining a nearly uniform score depth is to place the glass surface to be scored into slight tension while scoring. This technique may be accomplished by lowering the height of the support wheel 218 relative to the height of the major portion of the lower surface of the glass sheet G to be cut.

If desired, a heater (not shown) may be positioned on the side of cutting apparatus 200, generally aligned in trailing relation with the cutting head assembly 210 so as to heat the scored portion of the glass after scoring in order to help draw the score through the glass sheet. In addition, a flare cutter 228 may be mounted on the upper frame 206 in order to provide relief scores, as required, in the glass sheet G to help facilitate breakout, as will be discussed later. In the particular embodiment illustrated in FIG. 5, the flare cutter 228 includes a cutting head 230 mounted at the far end of a reciprocating arm 232 of cylinder 234 which is pivotally mounted from the upper frame 206. With the arm 232 fully extended out from cylinder 234, a piston 236 applies a downward force to the flare cutter 228 to contact the glass surface with cutting head 230. As piston 236 continues to apply pressure, the arm 232 is retracted by cylinder 234 to score the glass and provide a relief cut.

The breakout apparatus 300 is configured to remove the salvage glass from about the perimeter of the scored glass sheet. Although not limiting in the present invention, in the particular embodiment illustrated in FIGS. 7, 8, and 9 the breakout apparatus 300 is a mechanical/thermal arrangement positioned above the support station 100. Mainframe 302 straddles the support station 100 with cross beam 304 on columns 306. Cross beam 304 and auxiliary framing 308 support plate 310 which in turn supports a guide arrangement 312 for breakout frame 314. The breakout frame 314 includes columns 316 which extend through plate 310. The upper ends of columns 316 are interconnected by cross member 318 and are interconnected at its lower end by breakout plate 320. Piston member 322 is secure at one end to cross member 318 and at its other end to plate 310 so that extension and contraction of piston arm 324 of the piston 322 lifts and lowers breakout frame 314. In the particular embodiment of the invention illustrated in FIG. 7, columns 316 and guided by rollers 326 as piston 322 moves frame 314 through plate 310. Breakout plate 320 includes a plurality mechanical breakout members 326 and thermal breakout members 328. In particular, referring to FIGS. 8 and 9, each mechanical breakout member 326 includes a two stage air cylinder 330 secured to post 332 which extends through adjustable collar 334. Collar 334 is slideably mounted along rod 336 which is pivotally supported on breakout plate 320 at collar 338. With this arrangement, the position and orientation of cylinder 330 is fully adjustable, i.e., it may rotate about or slide horizontally along rod 336, move linearly along an axis defined by post 332, or pivot about collar 338 at plate 320. The air cylinder 330 includes pad 340 on the lower end of downwardly extending arm 342. The mechanical breakout members 326 are positioned around the glass sheet G, inboard of the glass sheet edge, but outboard of its scored part configuration. The thermal breakout members 328 of the breakout apparatus 300 each include a high intensity burner 344 secured to post 346, adjustably positioned on a rod 348 by collar 350, which is pivotally rotationally, and slideably amounted on breakout plate 320 by collar 351 in a manner similar to that of the air cylinders 330. In operation, after scoring, the breakout frame 314 is lowered over the scored glass via piston 322. The air cylinders 330 lower pads 340 onto the glass sheet G in their first stage position to initially load the upper surface of salvage glass in a state of tension. The high intensity burners 344 then heat the glass sheet at selected locations to drive the score through the glass sheet and allow the salvage glass to vent. The air cylinders 330 then further extend arms 342 to their second stage position to remove any remaining salvage from the glass sheet. Although not limiting in the present invention, the burners 344 may be a continuously ignited burner or include a high voltage ignition firing system to ignite the burner flame when required. In addition, the air/gas mixture of the burners may be regulated so as to vary the flame intensity.

The salvage from the glass sheet G is preferably collected and removed from the assembly 10. If the salvage glass is allowed to fall freely from the glass sheet after breakout, a hinging effect along is lower edge will cause chipping and other edge imperfections. Although not limiting in the present invention, in the particular embodiment of the invention illustrated FIGS. 1, 2, 7 and 8, a splitting salvage collection plate 124 is positioned below the glass sheet G at support station 100 to prevent the free-fall of the salvage after breakout. The plate 124 is preferably positioned close the underside of the glass sheet G so as to allow the glass to flex and draw the score through the glass sheet thickness while minimize the hinging effect and resultant chipping. Cylinders 126 (shown only in FIGS. 1 and 7) are positioned below plate 124 to split the plate 124 and pivot each plate portion downward as shown in phantom in FIGS. 1 and 7 which serves to remove salvage and dump it into a salvage collection bin (not shown).

The breakout apparatus 300 may be further enhanced by supporting the breakout members 326 and/or 328 on automatically adjustable mechanisms (not shown) that can be moved by the controller 12 based on manipulation of the data file for a particular part. In this manner, the entire cutting, breakout, and edging operation can be changed from one part configuration to another without any additional adjustments.

Figure 7:
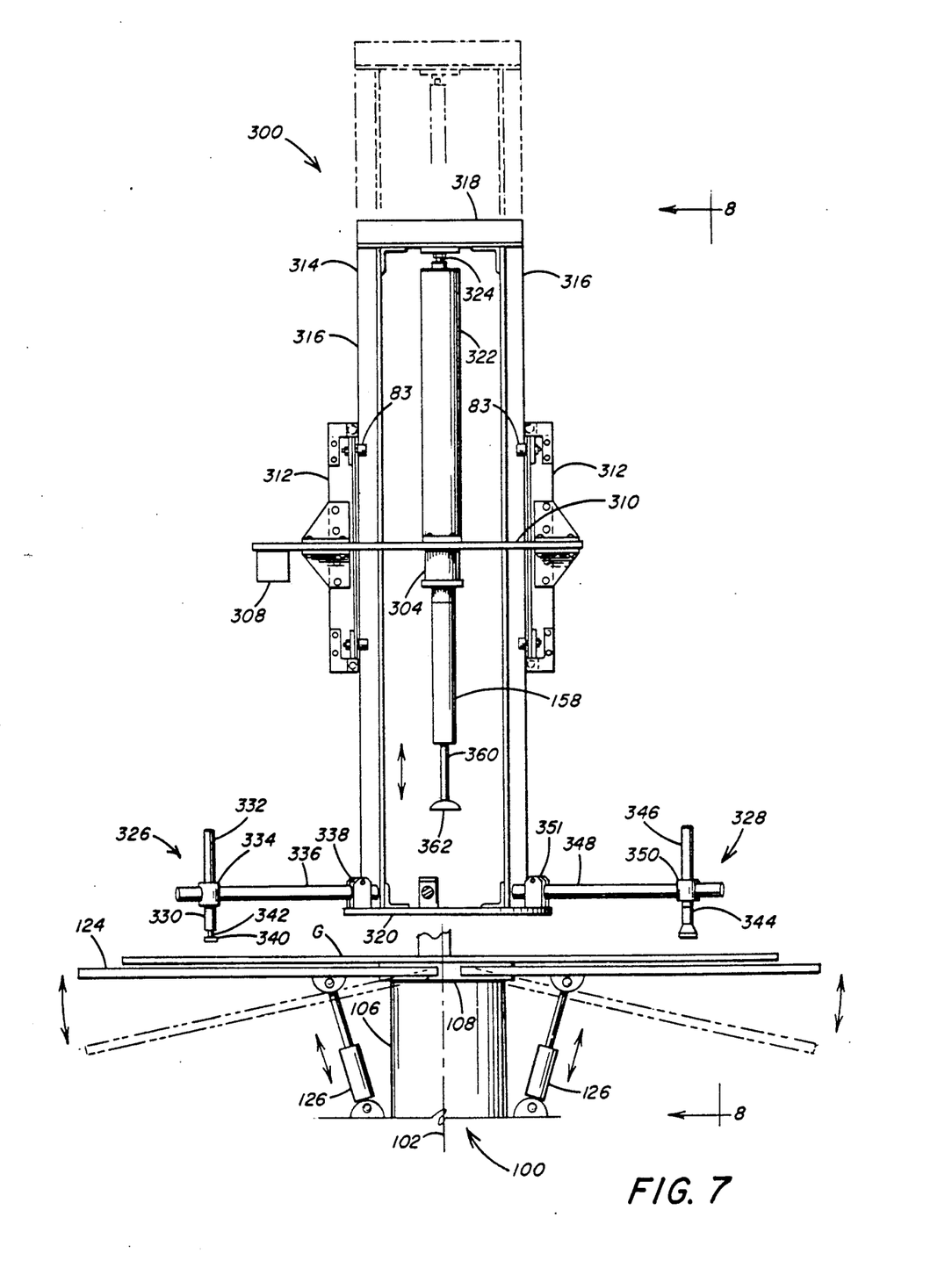
FIG. 7 is an enlarged elevational view of the breakout assembly illustrated in FIG. 1.
Figures 8, 10:
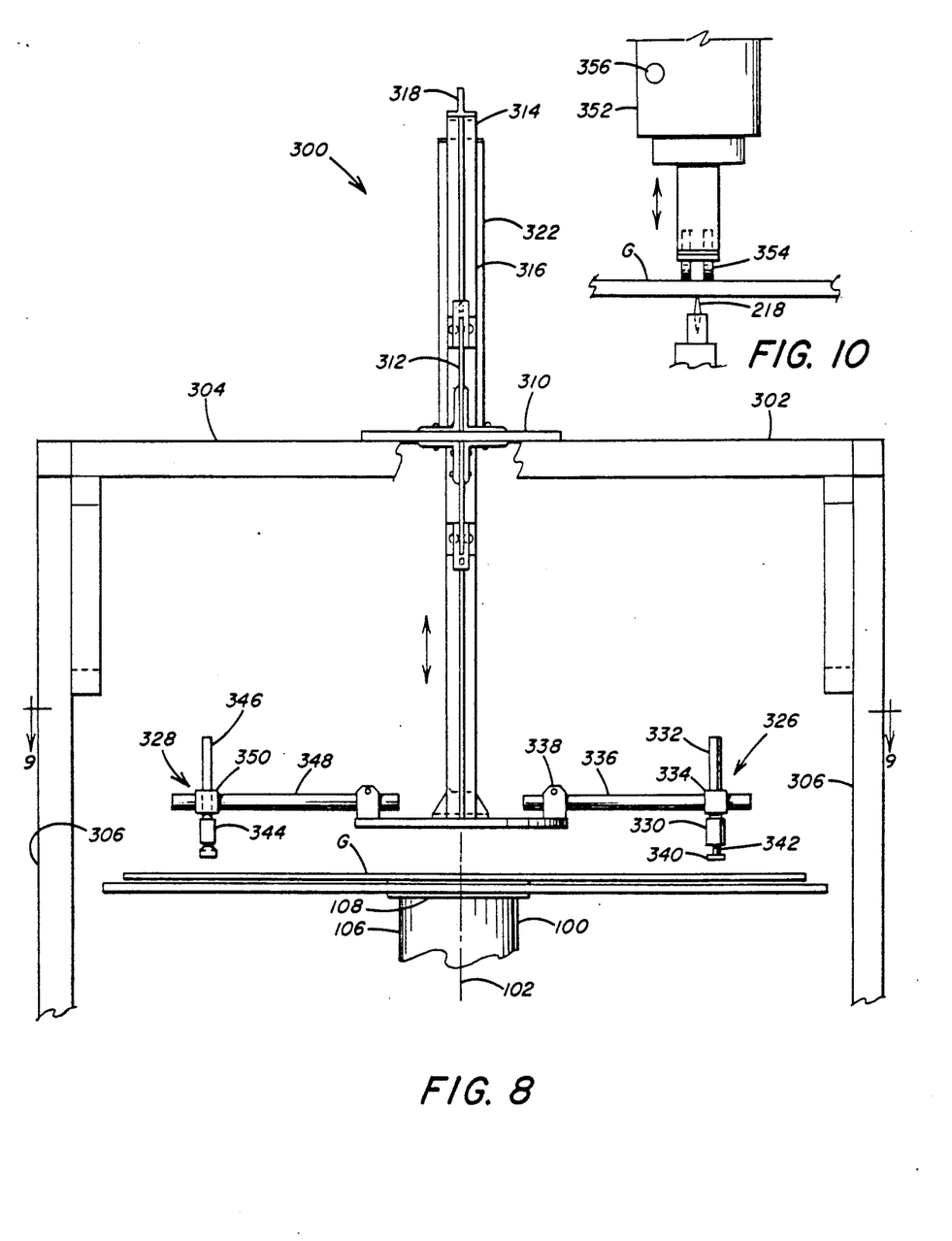
FIG. 8 is an end view of the breakout assembly along line 8-8 of FIG. 7.
FIG. 10 is an elevational view of a dolly tracer wheel assembly taken through line 10—10 of FIG. 6.
Figure 9:
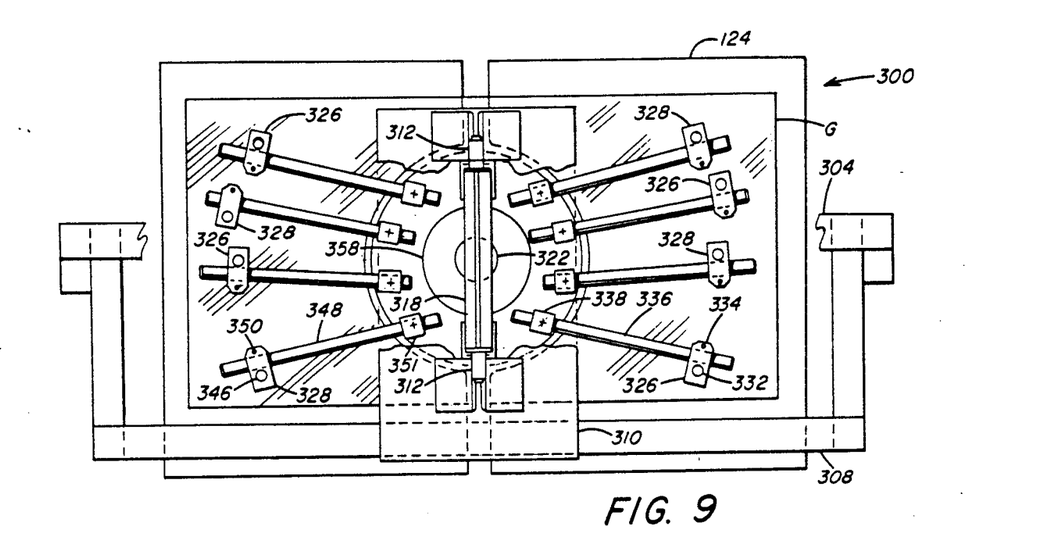
FIG. 9 is a view of the breakout assembly taken along line 9—9 of FIG. 8, with portions removed for clarity.

The breakout apparatus 300 shown in FIGS. 7, 8, and 9 includes both mechanical and thermal components, but it is understood that other methods of breakout may be used, such as but not limited to vibration or score preheating. In one particular alternate method for breakout, a dolly tracer wheel assembly 352 may be used as shown in FIGS. 6 and 10. The tracer wheel assembly 352 includes a pair of upper tracer wheels 354 that straddle blank cutting wheel 218. The cutting head assembly 210 and tracer wheel assembly 352 may be mounted on a slide assembly 356 as shown in FIG. 6 so that after the cutting apparatus 200 has made a cutting pass to score the glass sheet G to the desired configuration, the tracer wheel assembly 352 slides over the blank wheel 218 and a second pass is made about the perimeter of the glass sheet G along the scored line by the tracer wheels 354. Wheels 354 straddle the score and apply a moment about the score causing the score to deepen as the pattern is traced. After this second pass, the cutting apparatus 200 is retracted and the breakout apparatus 300 is lowered to remove the salvage as discussed earlier.

Referring to FIGS. 1 and 2, the edging apparatus 400 includes a mounting base 404 supporting a height adjustable support bracket 406. A spindle and wheel assembly 408, a wheel drive 410, and a vacuum coolant recovery system 412 are mounted on the support bracket 406. During the edging operation, drive 414 moves the mounting base 404 along with the edging assembly on the horizontal slide 416 along linear axis 402, toward and away from the support station 100. If required, a top clamp may be added to hold the cut glass sheet in place at the support station 100 during edging. Although not limiting in the present invention, referring to FIG. 7, a piston 358 is secured to the lower surface of cross beam 304 of breakout assembly 300. Arm 360 of piston 358 extends downward through an opening in breakout plate 320 so that pad 362 on the arm 360 presses the glass sheet downwardly against the vacuum plate 108 of the vacuum chuck 106 to hold the glass sheet G in place.

The edging operation is carried out through the coordinated motion of the rotary axis 102 and linear axis 402. The data to control these axes i.e., their position and required velocity or changes in velocity, are generated by the same digitized data file as used in the numerically controlled cutting process. The controller 12 manipulates the digitized file, determines the spindle and wheel assembly's 408 path by offsetting the glass part a distance equivalent to the edging wheel radius and coordinates the movement of the glass sheet G and edging apparatus 400. Average edge grinding speeds ranging from 6 to 10 inches (15.2 to 25.4 cm) per second have produced acceptable ground edges.

The controller 12 may include wheel wear compensation software for the wheel assembly 408 to permit the wheel's edge to be manipulated as wear occurs. The initial set up parameters are determined by measuring the wheel diameter of assembly 408. As the wheel is used and begins to wear, a new smaller wheel diameter is entered into the control software.

The spindle and wheel assembly 408 may also include a double wheel arrangement (not shown) i.e., a first wheel to remove the bulk of the glass edge and a second trailing wheel to provide the final finish to the edge. Such an arrangement would require an additional motor to pivot the double wheel arrangement above a vertical axis at the assembly 408. Using the data file, the controller 12 can control the pivoting action of the double wheel arrangement about the additional vertical axis in conjunction with the linear movement of the edging apparatus 400 along axis 402 and the rotation of the glass sheet G about vertical axis 102 at support station 100 so as to maintain contact between the glass part edge and the wheels.

In operation, the cutting apparatus 200, the breakout apparatus 300, and the edging apparatus 400 are all initially in a retracted position, i.e., the cutting apparatus 200 and edging apparatus 400 are moved away from support station 100 along axes 202 and 402, and breakout apparatus 300 is moved upward. A glass sheet G is positioned on the vacuum platen 108 of the support station 100 and aligned in any convenient fashion. A vacuum is drawn along platen face 118 to hold the glass sheet G in position. The cutting apparatus 200 is then moved on slide 222 along axis 202 so that the glass sheet G is positioned between the cutting wheel 216 and support wheel 218, with the salvage portion of the glass sheet extending into the throat of the cutting apparatus 200. During the scoring operation, drive 110 rotates the glass sheet G on the vacuum chuck 106 about vertical axis 102 while motor 224 moves bracket 204 along the horizontal slide 222. Axes 102 and 202 are synchronized through software controls so as to coordinate the rotation of the glass sheet G about vertical axes 102 and the linear movement of the cutting head 216 along the horizontal slide 202. The loading device 214 varies the pressure applied to the cutting wheel 216 in response to signals received from the controller 12 to maintain a constant score depth, as discussed earlier.

After scoring, the cutting apparatus 200 moves away from the support station 100 along axis 202 so as to allow the breakout apparatus 300 to be lowered over the scored glass sheet G. As discussed earlier, air cylinders 330 extend arms 342 out to a first stage to initially load the upper surface of the salvage glass in tension while the high intensity burners 344 heat the glass at selected locations to generate venting along the scores. The cylinders arms 342 are then fully extended to remove any additional salvage from the glass and expose the cut glass edge. The salvage glass is initially deposited on the salvage collection plate 124 which is then pivoted downward by cylinders 126 to remove the salvage from the support station 100.

The breakout apparatus 300 is then retracted and the edging apparatus 400 is moved into position in a manner similar to that discussed for the cutting apparatus 200. The cut glass sheet G is rotated about axis 102 while the wheel and spindle assembly 408 on bracket 404 slides linearly along axis 402 towards and away from the glass edge. Controller 12 coordinates the movement of the glass sheet G and the edging apparatus 400.

After edging, the glass part is removed from the support stand 100, and moved to its next processing station and the next glass sheet is positioned on the support stand 12.

The present invention discloses a glass sheet cutting and edging operation wherein the glass sheet remains secured to its original support throughout the cutting, breakout and edging operation. Although the support preferably remains at a set location, it is contemplated that the entire support may be accurately indexed with the glass sheet remaining secured to the support. The combination of a single station apparatus using numerical controlled technologies to control the processing tools will improve the product quality. Because of the one time positioning of the glass on its support, the parts can be cut closer to specification which in turn allows for less glass removal during the edging process. In addition, with less glass removal during the edging process, there are potential cost savings through less edger wheel wear. Furthermore, the system will have enhanced flexibility. The use of numerical control technology allows for minimal pattern change-over time and provides the capacity for running various patterns simultaneously, for example, alternately processing inner and outer glass sheets for a laminated windshield or left and right hand vehicle window sets.

It should be appreciated that different tooling other then cutting wheels, thermal/mechanical breakout, and grinding wheels, may be mounted on the single station apparatus 100 to cut, breakout, and edge a glass sheet. For example, an abrasive jet cutting device which penetrates the glass with a high velocity stream of cutting fluid, such as water combined with an abrasive as taught in U.S. Pat. No. 4,702,042 to Herrington et al. can be mounted to move along a horizontal linear axis as the glass sheet rotates about a vertical axis so as to cut and edge a part from a glass sheet in a single operation. As an alternative, a diamond edge band saw may be mounted on the linear axis to cut the glass part.

It would now be obvious to one skilled in the art that addition processing operations may be incorporated into the present invention. For example, one or more drilling stations may be positioned on slide arrangements that move along a linear axis in a manner similar to that discussed earlier for the cutting and edging units. The controller 12 would coordinate the movement of the rotary and linear axes to properly position the drills relative to the cut glass part. Similarly, an additional edger that provides a finished or bevelled edge may be incorporated into the system 10.

The form of the invention shown and described in this disclosure represents an illustrative preferred embodiment in various modifications thereof. It is understood that various changes can be made without departing from the spirit of the invention as defined by the claimed subject matter which follows.

We claim:

1. A method of processing a sheet of material comprising:
   supporting said sheet to allow only rotational movement;
   rotating said sheet in a predetermined plane about a stationary axis of rotation;
   cutting said sheet during said supporting and rotating steps to define a part having a desired outline; and
   edging said part during said supporting and rotating steps.

2. The method as in claim 1 wherein said cutting step includes scoring a surface of said sheet to form said outline of said part and removing undesired trim portions of said sheet from said supported part.

3. The method as in claim 2 further including the step of supporting said trim after said removing step and directing said trim away from said supported part.

4. The method as in claim 2 wherein said cutting step includes moving a scoring device linearly along a first generally horizontal axis, said edging step includes moving an edging device linearly along a second generally horizontal axis and said rotating step including rotating said sheet about a generally vertical axis and further including the step of automatically coordinating said linear movement of said scoring device and edging device along said respective horizontal axes with said rotational movement of said part about said vertical axis such that said outline of said part is contacted by said scoring device and said edging device.

5. The method as in claim 4 further including the step of maintaining a generally constant scoring depth during said scoring step.

6. The method as in claim 5 wherein said maintaining step includes automatically varying the pressure applied to said sheet by said scoring device.

7. The method as in claim 4 wherein said removing step includes heating selected portions of said sheet to draw said score through the thickness of said sheet and fracturing said sheet along said score.

8. The method as in claim 7 wherein said removing step further includes the step of applying a tension stress to said sheet at said scored surface.

9. The method as in claim 8 wherein after said scoring step and prior to said removing step further including the step of applying a moment to said sheet along said score to vent said sheet through its thickness along said score.

10. The method as in claim 1 wherein said cutting step includes penetrating the full thickness of said sheet with a high velocity, abrasive cutting fluid to remove undesired trim portions of said sheet and form the outline of said part.

11. The method as in claim 10 wherein said penetrating step includes moving an abrasive cutting fluid delivery device linearly along a first generally horizontal axis and said rotating step includes rotating said sheet about a generally vertical axis and further including the step of automatically coordinating said linear movement of said device along said horizontal axis with said rotational movement of said part about said vertical axis such that said cutting fluid penetrates said sheet about said outline of said part.

* * * * *